Sept. 24, 1963
S. J. WEEMS
3,105,037
CONCENTRIC TUBE FUEL ELEMENT SPRING
ALIGNMENT SPACER DEVICE
Filed Dec. 4, 1961
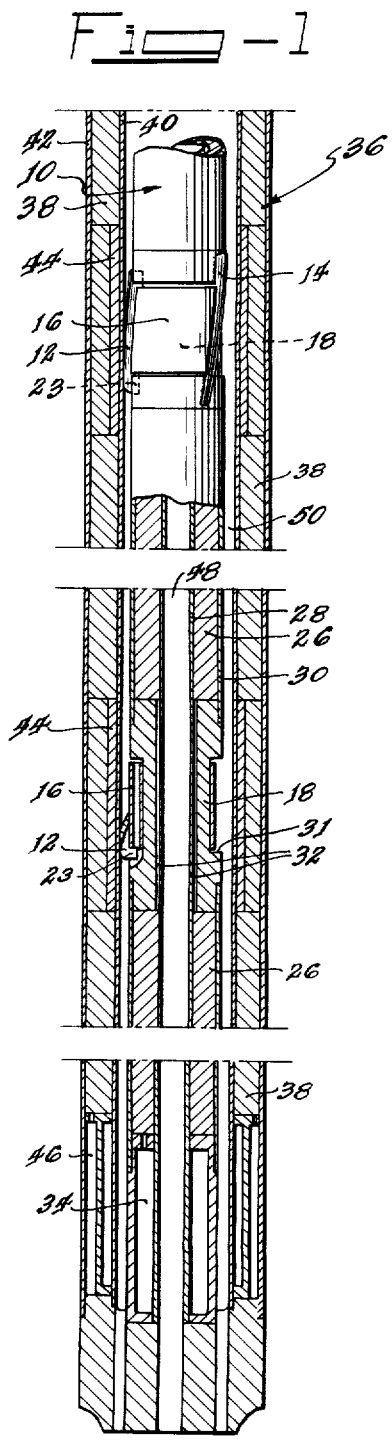
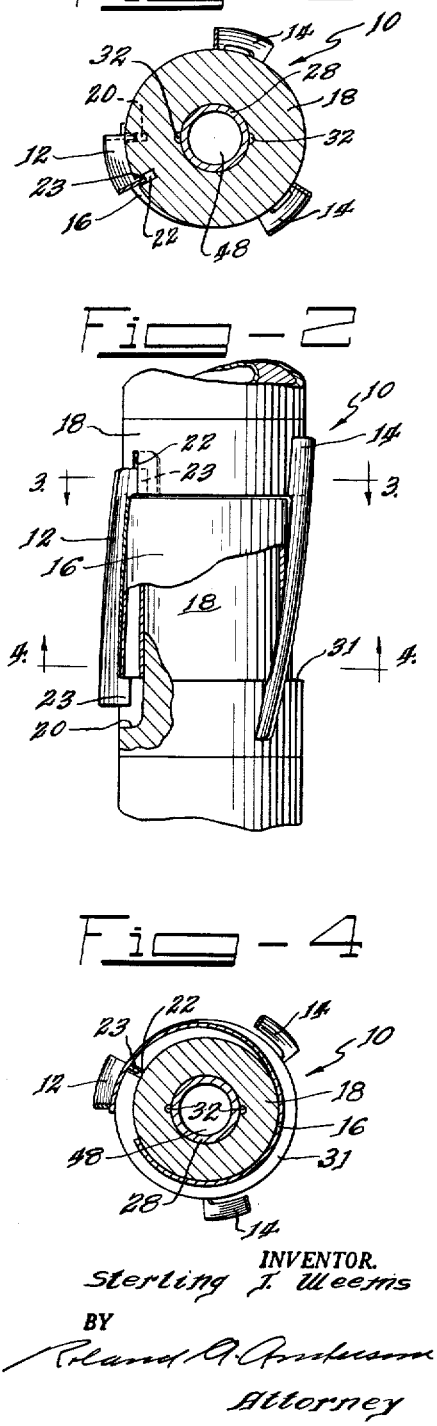
INVENTOR.
Sterling J. Weems
BY
Roland A. Anderson
Attorney

United States Patent Office 3,105,037
Patented Sept. 24, 1963

---

3,105,037
CONCENTRIC TUBE FUEL ELEMENT SPRING ALIGNMENT SPACER DEVICE
Sterling J. Weems, Safety Harbor, Fla., assignor to the United States of America as represented by the United States Atomic Energy Commission
Filed Dec. 4, 1961, Ser. No. 157,024
3 Claims. (Cl. 204—193.2)

This invention relates generally to the supporting of nuclear-fuel elements and, more specifically, to a means for yieldably supporting a fuel element in a coolant passage.

It is well known in the reactor art to provide radial ribs on fuel elements for supporting them in a coolant passage in a reactor in a radially spaced relation to the passage so that an annular space is formed between the fuel elements and the passage. Coolant may be allowed to flow through this space to remove the heat generated by the fuel elements durinng reactor operation. See, for example, FIG. 39 and column 43 of Fermi et al., U.S. Patent 2,708,656, dated May 17, 1955. In the Fermi construction, the supporting ribs are radial projections of the coolant passage which support the fuel element slugs on all sides. If the fuel elements are to be held tightly in the coolant passage, it may be very difficult to insert them into the passage without damaging the ribs or the passage itself. If the fuel elements become distorted or enlarged with reactor operation, it may be very difficult to remove them.

These difficulties and related problems become especially acute in high performance fuel elements such as in double annular fuel elements for use in the superheater region of boiling-water reactors. In such an application the steam being superheated passes through a longitudinal passage in the inner fuel element and through an annular passage between the inner element and the outer fuel element. Problems are encountered in that the rib designs heretofore known employed to maintain the inner and outer elements in a radially spaced relationship are susceptible to vibration, fretting, and wear of both the ribs and the cladding of the fuel element upon which the ribs bear. Any distortion, of course, changes the dimensions of the annular steam passage between the inner and outer elements and alters the performance of the reactor.

It is therefore an object of this invention to overcome the difficulties encountered in nuclear-fuel elements discussed in the preceding paragraphs.

It is another object of this invention to provide a nuclear-fuel element suitable for use within a coolant passage in a nuclear reactor.

It is still another object of this invention to provide a means of maintaining the concentricity of the inner fuel element of a double annular fuel element when operating under such high performance conditions as that encountered in the superheater region of a boiling-water reactor.

Other objects will become apparent as the detailed description proceeds.

In the drawings:

FIG. 1 is a longitudinal sectional view, partly in elevation, showing the rib construction of the present invention applied to double annular fuel elements;

FIG. 2 is a fragmentary elevational view, with parts broken away, showing the inner fuel element;

FIG. 3 is a transverse sectional view taken on line 3—3 of FIG. 2; and

FIG. 4 is a transverse sectional view taken on line 4—4 of FIG. 2.

Referring to FIG. 1, a nuclear-fuel element 10, of the present invention, has a plurality of sets of generally longitudinal, radial ribs 12 and 14, the ribs 12 being mounted on the fuel element so as to be radially movable with respect thereto, and the ribs 14 being attached to the fuel element so as to have no radial movement with respect to the fuel element. In each set, there is one radially movable rib 12 and two fixed ribs 14, and the ribs of each set are about equally spaced from one another peripherally of the fuel element. The rib 12 is connected to fuel element 10 with a wide spiral spring 16 coiled about rib adaptor section 18 of the fuel element. As shown in FIGS. 2 and 3, radially cut guide slots 20 and 22 in the adaptor section 18 receive the end portions 23 of rib 12 and fit the sides of the same so as to allow rib 12 only radial movement through the action of spring 16. Thus, the invention provides for spring-loaded, radially movable ribs for maintaining radial spacing of a fuel element within a coolant passage, said movable ribs serving to hold the fuel element in the desired position while providing for self adjustment should distorting stresses occur during reactor operation.

More specifically, fuel element 10 comprises tubular segments 26 of fissionable material within an inner tubular jacket or cladding 28 and an outer tubular cladding 30. The interior and the exterior of the fuel element are circular and cylindrical. The rib adaptor sections 18 are of inert material, separate the segments 26 of fissionable material, and provide mountings for the ribs 12 and 14 and spring 16. Each adaptor section 18 contains a peripheral recess 31 upon which spring 16 is spirally coiled, said recess forming a cylinder of smaller diameter than the diameter of the unrecessed end portions of the adaptor section 18. The spring 16 is coiled about substantially the entire periphery of the fuel element. Fixed ribs 14 are of a shallow U shape to allow for expansion and compression of spring 16, the base of the U extending across recess 31 and the sides of the U being welded or brazed to adaptor 18 along its unrecessed periphery. The movable rib 12 is also of a shallow U shape by virtue of its offset end portions 23. The inner edge of the base of the U of the rib 12 is welded or brazed to spring 16 near its outer end. The portions 23 of rib 12 extend longitudinally and radially beyond spring 16 and fit into guide slots 20 and 22, as previously stated. These slots are radially cut, run generally longitudinal according to the positioning of rib 12, and are of such width as to fit the sides of rib 12 and allow bidirectional, radial movement thereof with negligible tangential movement. Longitudinal movement of rib 12 is restricted by the contact of the sides of spring recess 31 with the edges of spring 16.

The ribs 12 and 14 have been described as being generally longitudinal. This is true in the general sense, and in the more specific sense, the ribs 12 and 14 extend somewhat helically of the fuel element 10 in order to give the fluid flowing over the fuel element a movement about the fuel element as the fluid flows therealong.

As shown in FIG. 1, sets of ribs 12 and 14 may be longitudinally spaced along fuel element 10 at intervals such that structural rigidity will be maintained. It appears that three ribs per set circumferentially spaced substantially 120 degrees apart is a desirable design, but such a configuration is not intended to be a limitation on this invention. Furthermore, the helical cant of the ribs is not a critical feature but is a design characteristic of boiling-water reactors which will be discussed later. The ribs may be positioned in any manner that reactor design considerations may demand as long as they run in a generally longitudinal direction.

The adaptor 18 is provided with fission gas leakage paths 32 so that connecting channels exist through the inert adaptor for gases produced during fission of the fissionable material 26. Thus, the fission gases are allowed to pass to the fission gas reservoir 34.

FIG. 1 depicts the invention as applied to improving the means of holding the fuel element 10 within an outer tubular fuel element 36. This fuel element comprises fissionable material 38 within an inner tubular cladding 40 and an outer tubular cladding 42, reinforcing sleeves 44 to strengthen the inner cladding 40 at the regions where the sets of ribs 12 and 14 bear, and a reservoir 46 at the end of outer fuel element 36 for collecting the gases produced in the same during fission. It should be noted that axial movement of fuel element 10 within the fuel element 36 may be prevented by axial pressure applied at the end of element 10, for example, by a spring (not shown).

In applying the fuel-element configuration discussed above to serve as the fissionable fuel of a boiling-water reactor, the double tubular assembly comprising fuel elements 10 and 36 is adapted to receive saturated steam at one end and discharge it as superheated steam at the other end after the steam flows axially through a passage 48 in the inner element 10 and an annular passage 50 between inner element 10 and outer element 36. The double assembly is adapted to be positioned vertically, along with functionally similar fuel assemblies parallel thereto and spaced therefrom, in a boiling-water reactor in which water is heated to saturated steam outside the outer element 36, and perhaps not directly outside the same, and the saturated steam is converted to superheated steam by passing through the passages 48 and 50. The helical cant of ribs 12 and 14 produces a helical steam flow pattern which is expected to reduce thermal distortion of annular passage 50. Boiling-water reactors of the type in question are more fully disclosed in reports GNEC–138 and GNEC–150, of General Nuclear Engineering Corporation, available from the Office of Technical Services, Dept. of Commerce, Washington 25, D.C. The portions of these reports relating to the claimed subject matter of this application, namely, page 10 and FIG. 2 of GNEC–138 and pages III–28 and IV–29 and FIGS. III–5, III–7, IV–4, IV–6 of GNEC–150, were disclosed by applicant as his invention to General Nuclear Engineering Corp., his employer, before the reports were written. Reference is also made to Untermyer, U.S. Patent 2,936,273, dated May 10, 1960, for a basic disclosure of boiling-water reactors.

Each of the fissionable cores 26 and 38 may be formed of $UO_2$ slightly enriched in the isotope $U^{235}$. These cores may be formed of a series of relatively short tubular pellets or by vibratory compaction of $UO_2$ powder. The jackets 28 and 30 and the spring 16 may be formed of an alloy composed of 76.0% nickel, 15.5% chromium, 1.0% iron, 0.35% manganese, 0.20% silicon, and 0.04% carbon; the jacket 40 and reinforcing sleeves 44 of an alloy composed of 73.0% nickel, 15.0% chromium, 6.5% iron, 2.3% titanium, 0.9% aluminum, 0.6% columbium, 0.3% silicon, 0.5% manganese, and 0.03% carbon; and jacket 42, adaptor 18, and ribs 12 and 14 of type 347 stainless steel.

Persons skilled in the art will, of course, readily adapt the general teachings of the invention to embodiments other than the specific embodiment illustrated. Accordingly, the scope of the protection afforded the invention is not intended to be limited to the particular embodiment illustrated, but should be determined only in accordance with the appended claims.

What is claimed is:

1. A nuclear-fuel element comprising a cylindrical body, a plurality of fixed radial ribs, a radially movable radial rib, and a wide spiral spring; said fixed ribs being rigid, generally longitudinal, short in length relative to said body, equal in radial projection, attached to the periphery of said body and spaced therearound; said radially movable rib being rigid, generally longitudinal, short in length relative to said body, peripherally spaced from said fixed ribs, and attached to said spring; said spring being coiled about substantially the entire periphery of body between the same and said radially movable rib; said body having slots therein so as to receive said movable rib and fit the sides thereof to hold the same in a fixed circumferential relationship with said fixed ribs while allowing the movable rib only radial movement.

2. The nuclear-fuel element according to claim 1, wherein said spiral spring is coiled within a peripheral recess in said body, said fixed ribs extending longitudinally over said recess and being attached to said body at only the unrecessed portion thereof.

3. The nuclear-fuel element according to claim 2, wherein said plurality of fixed ribs and said movable rib comprise a set thereof, said set being spaced from a like set at longitudinal intervals along the periphery of said fuel element.

References Cited in the file of this patent

UNITED STATES PATENTS

| | | |
|---|---|---|
| 711,966 | Hendrick | Oct. 28, 1902 |
| 1,049,761 | Perkins | Jan. 7, 1913 |
| 2,035,637 | Crickmer | Mar. 31, 1936 |
| 2,885,335 | Moore et al. | May 5, 1959 |
| 2,949,415 | Stubbs et al. | Aug. 16, 1960 |
| 3,030,291 | Butler et al. | Apr. 17, 1962 |
| 3,030,293 | Wyatt | Apr. 17, 1962 |

FOREIGN PATENTS

| | | |
|---|---|---|
| 213,799 | Australia | Mar. 6, 1958 |
| 563,793 | Belgium | July 3, 1958 |
| 875,462 | Great Britain | Aug. 23, 1961 |

OTHER REFERENCES

GNEC–138, Nuclear Superheat Development Program, November 1960, page 10 and Fig. 2.

GNEC–150, Steam-Cooled Power Reactor Evaluation, Apr. 30, 1961, pp. III–28 and III–29 and Figs. III–5, III–7, IV–4, and IV–6.

GNEC–136, A 200 Mw(e) Boiler-Superheater Reactor Preliminary Design, Oct. 25, 1960, pp. 30–38 and Figs. 5, 7, and 10.